Oct. 16, 1945. W. H. TROEDSON 2,387,218
GAUGE
Filed Nov. 5, 1943
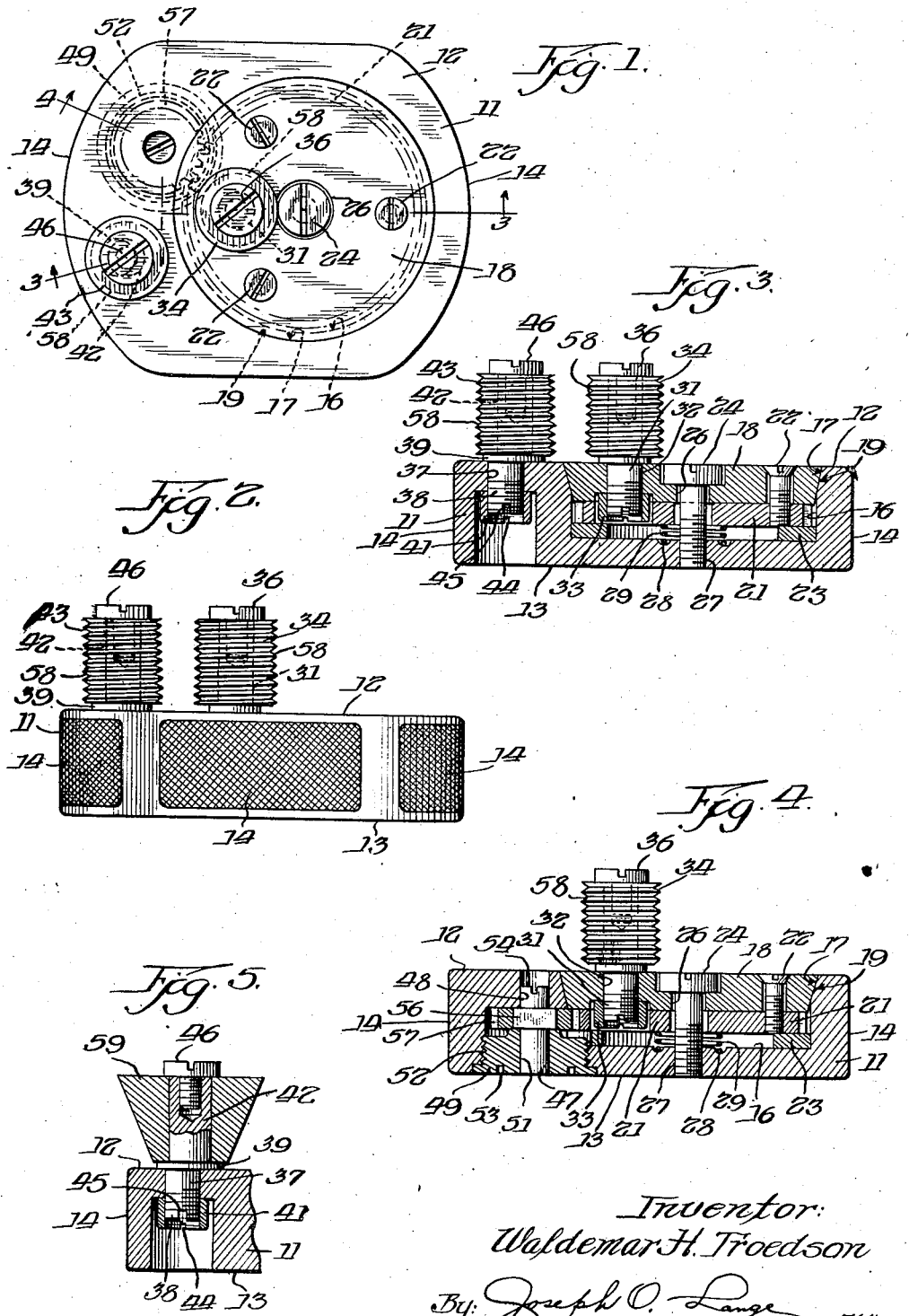
Inventor:
Waldemar H. Troedson
By Joseph O. Lange, Atty.

Patented Oct. 16, 1945

2,387,218

UNITED STATES PATENT OFFICE 2,387,218

GAUGE

Waldemar H. Troedson, Chicago, Ill., assignor to Crane Co., Chicago, Ill., a corporation of Illinois Application November 5, 1943, Serial No. 509,110

3 Claims. (Cl. 33—199)

This invention relates to gauges and is more particularly concerned with gauges of the adjustable type adapted for use in gauging work of various sizes and shapes, and is to be distinguished from the type of gauge provided with adjustable features permitting limited adjustment to compensate for wear or minor inaccuracies. An object of the present invention resides in the provision of a gauge which may be set or adjusted readily for gauging any desired distances within the working range of the gauge, and in which the working range preferably includes several inches although it may be either decreased or increased, as desired, by merely varying the sizes or relative position of the several parts constituting the structure. Gauges of this type are particularly useful for accurately checking critical dimensions on those parts manufactured in relatively small quantities, wherein the cost of making or buying special gauges would be excessive, as the gauge during its course of normal use may be initially set at the "go" dimension and then subsequently at the "not go" dimension.

This invention further contemplates the provision of an adjustable gauge embodying improvements in means for first setting same approximately at the predetermined size, and other means for more accurately adjusting the gauge to the desired size.

Another object of this invention resides in the provision of a pair of conveniently adjustable work-engaging members detachably mounted and interchangeable with other types and forms of work-engaging members, thereby extending the usefulness of the gauge to the checking of various sizes and forms of male threads, outside diameters, inside diameters, male and female dovetail members, etc.

A further object of this invention resides in the provision of improved means for moving one of the work-engaging members to an approximate predetermined position with respect to the other work-engaging member and then securing same against movement relative thereto.

A further object of this invention resides in the provision of a gauge which is simple to adjust for gauging a predetermined size or form, inexpensive in construction, and which will not readily get out of adjustment or order when in use.

The invention embodies other novel features, details of construction and arrangements of parts which are hereinafter set forth in the specification and claims and illustrated in the accompanying drawing, forming part thereof, wherein:

Fig. 1 is a plan view showing an adjustable gauge embodying features of this invention.

Fig. 2 is a side elevational view of same.

Fig. 3 is a sectional view taken along the line 3—3 of Fig. 1.

Fig. 4 is a sectional view taken along the line 3—4 of Fig. 1.

Fig. 5 is a detail sectional view showing a modified form of work-engaging member adapted for use on the gauge in checking dovetail constructions or the like.

Referring now to the drawing for a better understanding of this invention, a body 11 is preferably formed with flat, parallel top and bottom surfaces 12 and 13 respectively, and rounded ends which are preferably knurled at 14 for handling. A circular opening 16 having a taper seat 17 is formed in the body to receive a turntable 18 having a taper seat portion 19 for engagement with the seat 17. A gear 21 is secured to the inner side of the turntable member by means of screws 22, and a spacer ring 23 is provided between the gear and the bottom of the opening 16. A locking screw 24 extends through an axially disposed aperture 26 formed in the turntable for threaded engagement in the body at 27. A circular groove 28 is formed in the body and is concentric with the axis of the turntable to receive a helical compression spring 29, the latter member functioning to yieldably resist the seating movement of the turntable 18. A post 31 is secured in an aperture 32 provided in the turntable by a nut 33 to receive a work-engaging member 34 (hereinafter referred to as the opposing work-engaging member) for rotational movement thereon. The member 34 is held against axial displacement from the post by a screw 36 threaded into the end of the post.

An aperture 37 is provided in the body to receive the threaded end 38 of a post 39 which is held against movement therein by a nut 41. The opposite end of the post is formed to serve as a journal at 42 for a work-engaging member 43 (hereinafter referred to as the primary work-engaging member) and has its axis offset from the axis of the end 38 to provide an eccentric adjustment for the member 43. The nut 41 and the threaded end 38 of the post are slotted at 44 and 45 respectively to receive a screw driver or other adjustment tool (not shown) for reasons hereinafter explained. A screw 46 is threaded into the end 42 of the post to hold the member 43 against displacement therefrom.

A pinion shaft 47 is journaled in the body at 48 and in a nut 49 as shown at 51. The nut is threaded into the body at 52 by means of a tool engaging in spanner holes 53. The shaft is slotted at 54 to receive a screw driver and has a square portion 56 to engage a pinion 57 for engagement with the gear 21.

In Figs. 1 to 4, the work-engaging members 34 and 43 are shown in cylindrical form and provided with annular grooves 58 for gauging threaded parts. In Fig. 5 the work-engaging member 59 is formed in a frusto-conical configuration for the gauging of dovetail parts or the like.

In the use of a gauge of this type, the work-engaging members are preferably spaced at a predetermined setting by first loosening the screw 24 holding the turntable, then turning the pinion shaft 47 by means of a tool such as a screw driver engaging in the slot 54, thereby causing the pinion 57 to act through the gear 21 to rotate the turntable and to move the opposing work-engaging member 34 into approximate predetermined spaced relation with the primary work-engaging member 43. The screw 24 is then turned to move the turntable seat 19 into tight engagement with the body seat 17 and preferably with the face of the turntable flush with the face 12 of the body. The spacing ring 23 is provided to insure axial alignment of the opposing work-engaging member 34 with the primary work-engaging member 43 when the turntable is secured in seated position. If a closer adjustment is desired between the work-engaging members, the nut 41 is loosened to permit rotation of the post 39 and desired arcuate movement of the primary work-engaging member 43 about the axis of the post portion 38.

While the invention has been shown in but two forms it is obvious to those skilled in the art that it is not so limited but is susceptible of various changes and modifications without departing from the spirit thereof or the appended claims.

I claim:

1. A gauge comprising a base, a primary work-engaging member mounted on the base, a turntable journaled on the base, an opposing work-engaging member mounted on the turntable and disposed radially from the axis thereof, and complemental tapered seating surfaces formed on the base and turntable for sliding engagement.

2. A gauge comprising a base, a primary work-engaging member mounted on the base, a turntable journaled on the base, an opposing work-engaging member mounted on the turntable and disposed radially from the axis thereof, and complemental tapered seating surfaces formed on the base and turntable for sliding engagement, and means for securing the turntable against movement relative to the base.

3. A gauge comprising a base, a primary work-engaging member mounted on the base, a turntable journaled on the base, screw means for retaining the said turntable and base adjustably in engagement, an opposing work-engaging member mounted on the turntable and disposed radially from the axis thereof, and means for rotating the turntable for moving the opposing work-engaging member to a predetermined adjustment position, the said base and turntable having tapered seating surfaces for slidable engagement therebetween, and spring means interposed between the turntable and the base for yieldably resisting an inward or seating movement of the turntable.

WALDEMAR H. TROEDSON.